INVENTORS
GAYLORD W. BROWN
DONALD J. RISE
BY
*Learman and McCulloch*
ATTORNEYS

Oct. 24, 1967   G. W. BROWN ET AL   3,348,266
PLASTIC ARTICLE RIM FORMING APPARATUS
Filed Aug. 30, 1963   8 Sheets-Sheet 4

INVENTORS
GAYLORD W. BROWN
DONALD J. RISE
BY
Learman and McCulloch
ATTORNEYS

INVENTORS
GAYLORD W. BROWN
DONALD J. RISE
BY
Learman and McCulloch
ATTORNEYS

United States Patent Office 3,348,266
Patented Oct. 24, 1967

3,348,266
PLASTIC ARTICLE RIM FORMING APPARATUS
Gaylord W. Brown and Donald J. Rise, Beaverton, Mich., assignors to Brown Machine Company of Michigan, Inc., a corporation of Michigan
Filed Aug. 30, 1963, Ser. No. 305,651
18 Claims. (Cl. 18—19)

This invention relates to machines for forming curled rims on thermoplastic containers such as drinking cups and food containers, and more particularly to a high speed machine which is capable of receiving such containers from differential forming machines in a production line and forming rims thereon with such dispatch that both the forming machines and rim curling machine of the present invention can be run continuously.

Many machines for forming curled edges on paper drinking cups and the like have been designed and used over the years and some machines have been proposed and used for forming curled rims on plastic containers and the like. Such curled edges are formed on containers and the like to provide rigidity at the open mouth end extremities of the container bodies to resist radially inwardly directed pressures and, in the case of drinking cups, to additionally present a smooth, nonabrasive surface to the lips. Certain considerations must be taken into account in building a machine to form curled rims on plastic containers on a mass production basis which are not factors in the design of paper cup making machinery. For instance, the rims of plastic containers are not normally in a deformable state and the rims must be heated to such a state while maintaining the bodies of the cups relatively cool. Further, the very fact that the machine built must be a high speed machine capable of processing the continuous output of high speed, plastic container, forming machines is another consideration which also affects the ultimate design of the machine.

One of the prime objects of the present invention is to design a mass production machine of the character described which can be extremely rapidly operated in a continuous manner so that rims can be inexpensively formed on containers at a rapid rate in the neighborhood of three hundred per minute.

A further object of the invention is to design a machine which makes it possible to produce quality containers of a high degree of uniformity of size and shape, and which substantially eliminates the accidental production of defective containers which must be rejected upon inspection.

Briefly, the invention is concerned with a continuous machine including container supplying and preheating means and a carrier with container-shaped mandrels for receiving the containers individually therefrom, the container supporting mandrels being moved in a path of travel past or through rim heating means for heating the rims to a deformable state and the rims thence being sequentially engaged by a pair of rim curling forming and finishing rolls and cooled before ejection to the next stage of the manufacturing line. Cam controlled positioning means is employed to transfer the containers to the mandrels which are connected with a vacuum source so that the containers, once positioned on the mandrels by the transfer means, are firmly held during the subsequent processing operation before their air ejection to a collecting tube.

Other objects and advantages of the invention will be pointed out specifically or will become apparent from the following description when it is considered in conjunction with the appended claims and the accompanying drawings, in which:

FIGURE 13 is a sectional, side elevational view illustrating a modified embodiment of the invention in which a differing preheating means is employed;

FIGURE 14 is a fragmentary, transverse, sectional elevational view illustrating a modified heating system which may be used for heating the rims of the containers prior to and during the forming operation; and FIGURE 15 is a top plan view thereof.

Figure 1:
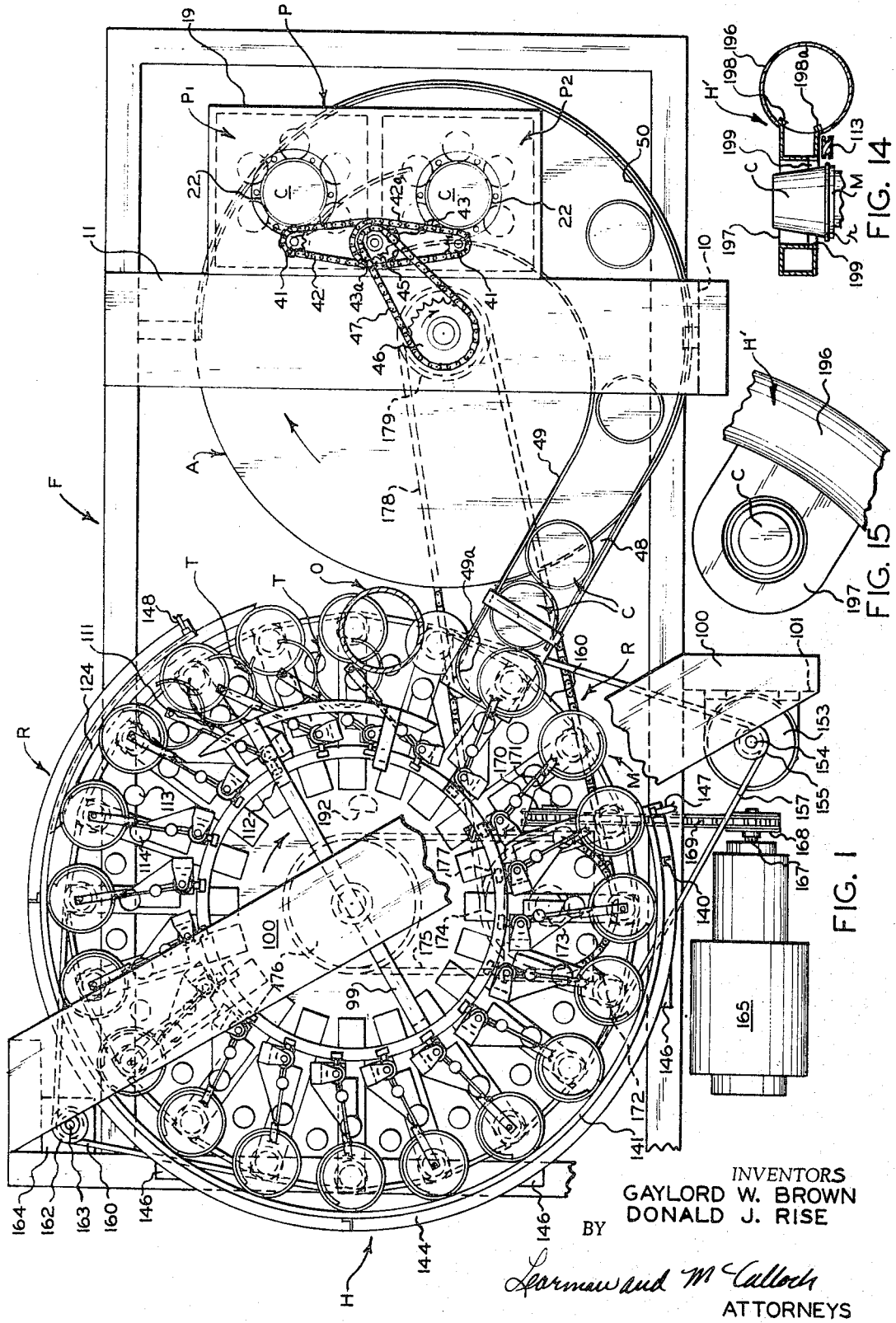
FIGURE 1 is a top plan view of the entire machine with parts thereof broken away and, in some instances, omitted in the interests of clarity.

Referring now more particularly to the accompanying drawings, in which only preferred embodiments of the invention have been depicted and will be described, a letter F generally indicates the frame of the machine which, as shown in FIGURE 1, incorporates a pair of container unstacking and preheating assemblies generally designated $P_1$ and $P_2$ for two vertical stacks of containers C. The containers C are deposited in pairs by the assemblies $P_1$ and $P_2$ on a rotary table assembly A and conveyed clockwisely to a continuously rotating carrier assembly R which conveys the container past additional heating means H for heating the rims of the containers to the required forming temperature and thence utilizes carrier mounted forming tools or rolls for curling the edges of the rims. Cam operated transfer units T also mounted by the carrier assembly (see FIGURES 1, 2 and 9) are employed to remove the containers C to individual mandrels M on the carrier assembly R. Finally, once the curled rims have been formed on the containers and there has been some cooling thereof, air under pressure is employed to blow the formed containers from the mandrels M out an outlet conveying tube O (see FIGURE 1). The immediately preceding matter constitutes a general description of various elements of the machine and a more detailed description follows.

Figure 2:
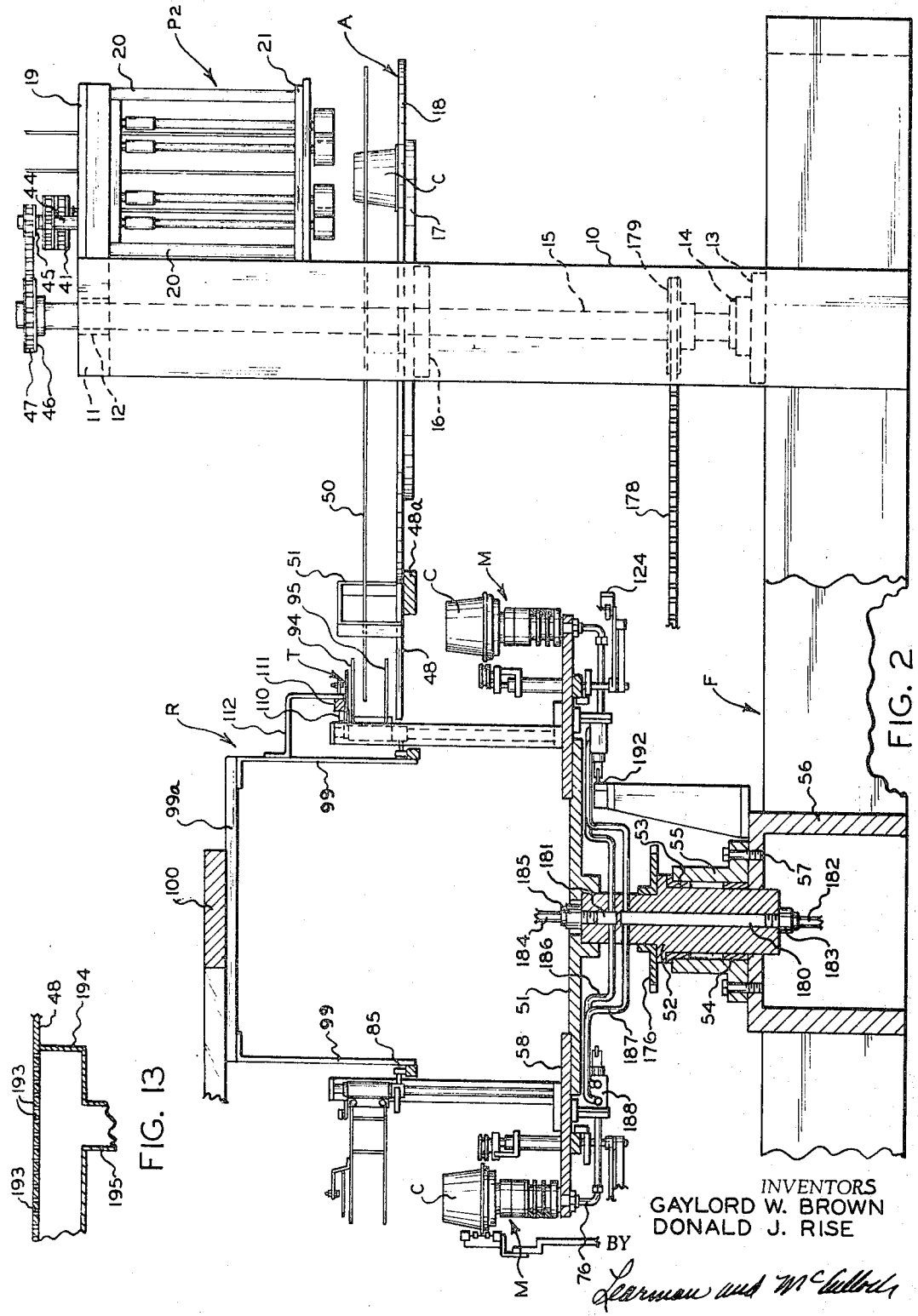
FIGURE 2 is a sectional, side elevational view of the machine with parts thereof omitted for convenience, illustrating particularly the vacuum-air system which is employed to hold and eject the containers, respectively.

The frame F of the machine may be generally rectangular in configuration and, as shown in FIGURES 1 and 2, may mount vertically extending side columns 10 which are connected at their upper ends by a cross member 11. The member 11 supports a bearing 12, and a lower cross member 13 also supports a bearing 14, to journal a vertical shaft 15 on which the rotatable table assembly A is fixed. As shown particularly in FIGURE 2, a collar member 16 fixed to the shaft 15 supports a table base 17 and the table conveying top 18 which receives the containers individually from the preheating assemblies $P_1$ and $P_2$ is mounted thereon.

The container preheating assemblies

The container rim preheating means P in the illustrated form of the invention comprises a pair of container heating and unstacking assemblies which are hung on the top cross member 11, as shown in FIGURES 1 and 2. A common top plate 19 connects the pair of unstacking assemblies $P_1$ and $P_2$ which are mounted in side-by-side relationship as shown in FIGURE 1. Since each of the assemblies $P_1$ and $P_2$ are identical, only the unit $P_1$ will be described. It is to be understood that the units $P_1$ and $P_2$ operate in unison to deposit containers C to the table assembly A.

Figure 4:
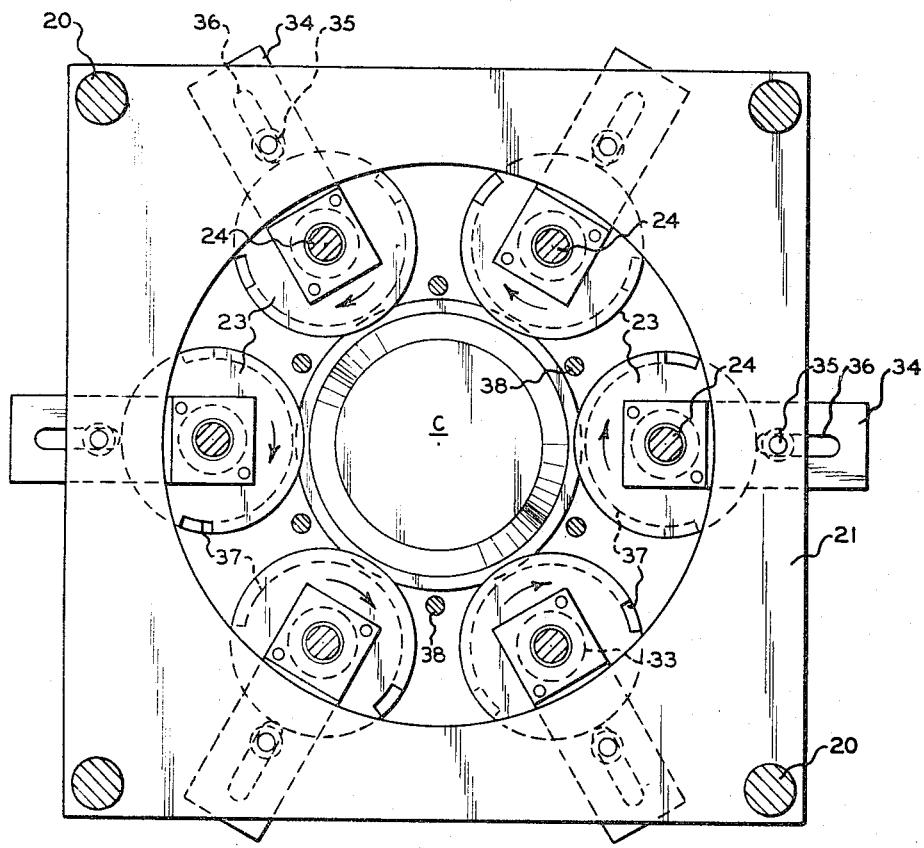
FIGURE 4 is a transverse sectional, plan view thereof, taken on the line 4—4 of FIGURE 3.
Figure 10:
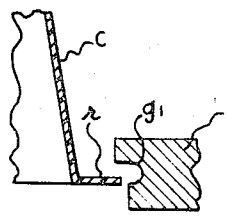
FIGURE 10 is an enlarged, fragmentary, sectional, side elevational view showing the leading roll prior to its engagement with the container rim.
Figure 5:
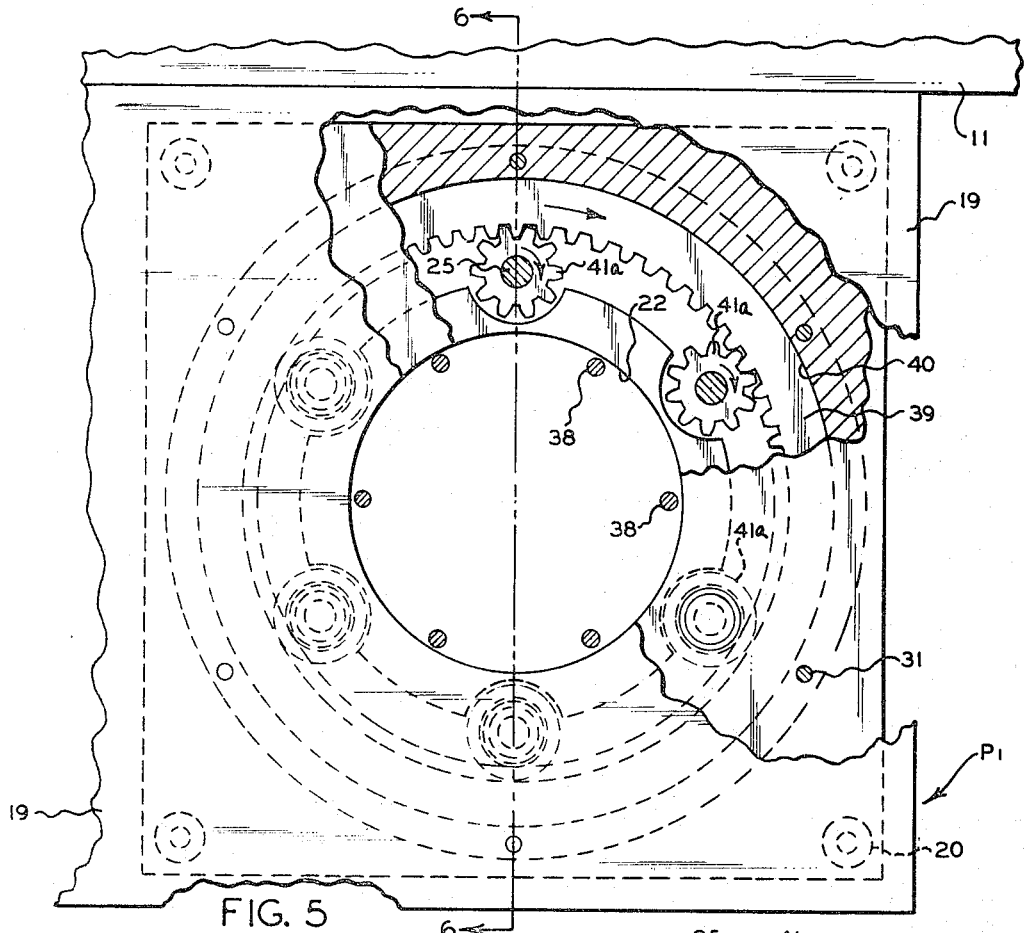
FIGURE 5 is a fragmentary plan view of one of the container unstacking and preheating assemblies, which is partly in section, to illustrate the drive mechanism for the revolving members which individually remove the containers from the preheating assembly.
Figure 6:
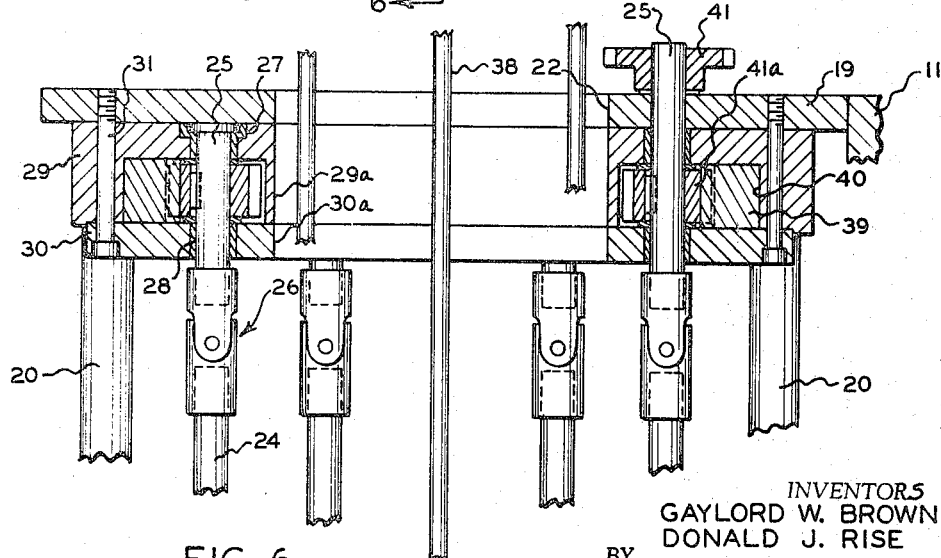
FIGURE 6 is a fragmentary, transverse, sectional, elevational view taken on the line 6—6 of FIGURE 5.

In the unit $P_1$, corner support rods 20 (see FIGURES 2, 4, and 5) are provided to support the bottom plate 21 of each unit. An opening 22 is provided in the top plate 19 so that a stack of containers may be fed from above, the stack being supported and slowly revolved by rotating grooved disk members 23 in the manner indicated in FIGURE 3. The grooved disk members 23 are supported by shafts 24 from upper shafts 25 (see FIGURE 6) through universal joint coupling members 26. Bearings 27 and 28 in housing plate members 29 and 30 which are secured to the top plate 19 by suitable bolt members 31 or the like journal the shafts 25, and it will be seen that openings 29a and 30a are provided in the plate members 29 and 30 in alignment with the opening 22 to permit the downward passage of a stack of containers C. Mounted on the lower ends of the shafts 24 are ball joints 32 which rotatably support the shafts 24 in sockets 33 provided in shaft support plates 34 which are connected to the bottom plate 21 by bolt members 35, the bolts 35 extending through slotted openings 36 in the plates 34 so that the plates 34 can be radially adjusted and different sizes of containers processed when desired.

Figure 3:
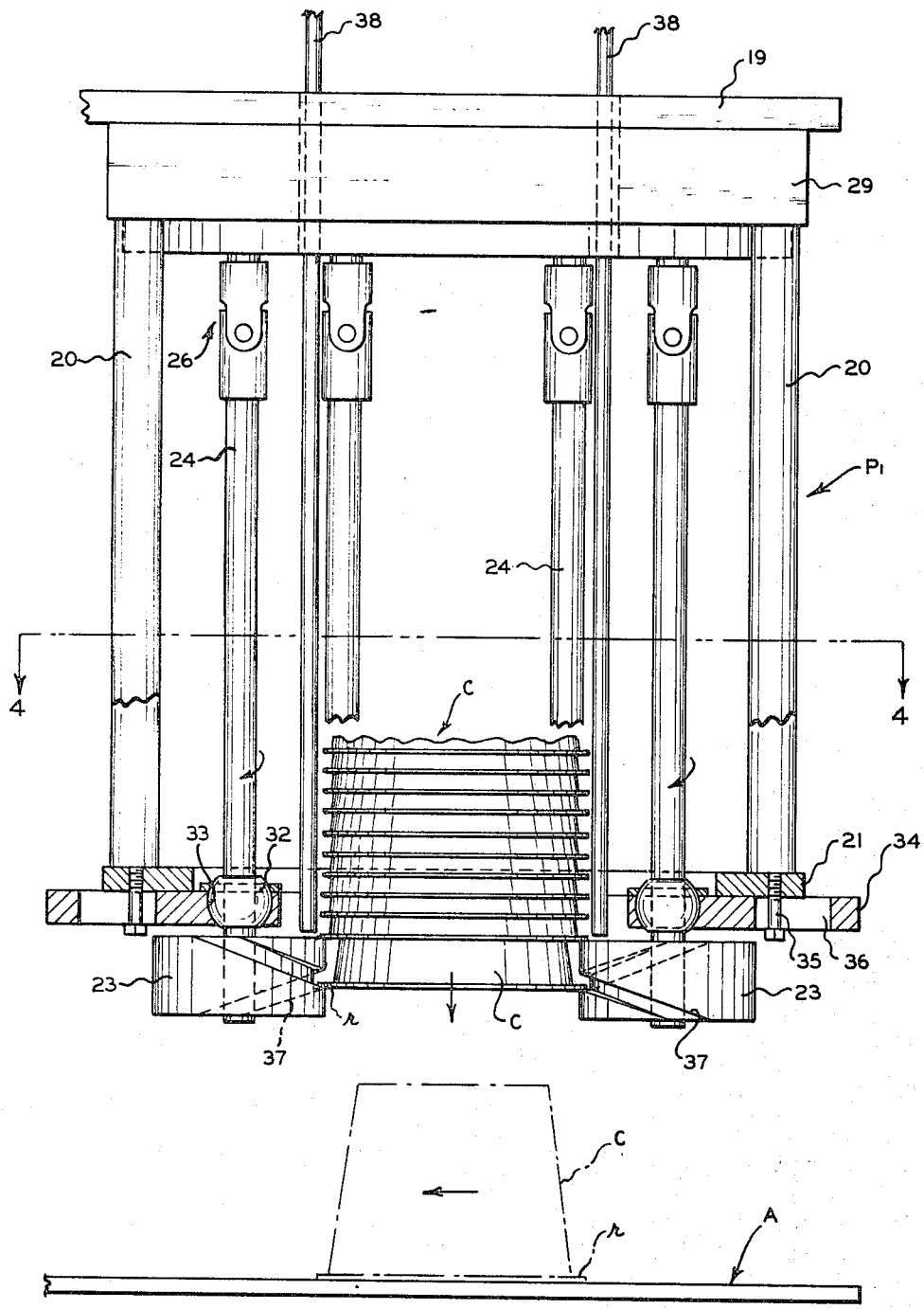
FIGURE 3 is an enlarged, side elevational view of one of the container unstacking and preheating assemblies which the machine employs.

Provided in the support disks 23 are spiral grooves 37 (see FIGURE 3) which remove the lowermost container C from the stack thereof and permit it to drop to the rotary table A. The diameter of support disk 23 is such that, as shown in FIGURE 3, the immediately superjacent container, and thereby the stack of containers, is revolvably supported on the upper surface thereof, the laterally projecting rim of the immediately superjacent container engaging the top surface of disks 23 until its rim r is engaged within the grooves 37 and lowered thereby. Electrically powered, resistance heating rods 38 which may, for instance, be the Chromalox rods manufactured by Frank L. Wiegand Co., of Pittsburgh, Pa., extend through the openings 22, 29a and 30a adjacent the laterally projecting rims r of the cups C and may be supported from above in any suitable manner. Certain of these rods 38 may be simply guide rods if it is not believed desirable to use as many heating rods. The spirally grooved wheel members 23 are driven from the shaft 15 through a rotatable ring gear 39 journaled within an opening 40 provided in the gear housing plate 29, the ring gear 39 being in mesh with gears 41a fixed on the shafts 25, as shown.

In the case of each of the assemblies $P_1$ and $P_2$, one of the shafts 25 is extended through the top plate 19 and mounts a drive sprocket 41. A chain 42 (see FIGURES 1 and 2) connects the sprocket 41 of the assembly $P_1$ with a sprocket 43 mounted on a shaft 44 and a chain 42a connects the sprocket 41 of the assembly $P_2$ with a sprocket 43a on the shaft 44. Mounted on the upper end of shaft 44 is a sprocket 45 which is connected with a sprocket 46, fixed on the shaft 15, by means of a drive chain 47. Thus, it will be seen that the unstacking rollers 23 are driven by the same shaft 15 which drives the table assembly A.

Mounted on a support 48a extending from the frame F is an extending platform or conveyor plate 48 which leads to the periphery of the carrier assembly R, as shown in FIGURES 1 and 2. Guide wires 49 and 50 (see FIGURES 1 and 2) are supported in position by the frame F, there being a bracket 51 mounted by the platform 48 which anchors the front ends of wires 49 and 50. It will be seen that the guide wire 50 terminates short of the outer end of platform 48 and that the guide wire 49 has an inwardly curved portion 49a so that containers C which are crowded along the platform 48 by the revolving table assembly A are moved into a predesignated position in engagement with the section 49a from which they may be swept to one of the mandrels M by transfer unit T to be presently described in detail. Both the transfer mechanism T and the mandrels M are mounted on the carrier assembly R and revolve therewith.

The carrier assembly

As shown particularly in FIGURE 2, the carrier assembly R includes a table member 51 mounted on a shaft 52 which is journaled in bearings 53 and 54 carried by a bearing block 55 which is bolted to a central frame base member 56 as at 57. Bolted to the table member 51 as at 58a are radially extending plate members 58 which mount the mandrels M in circumferentially spaced relationship. As shown particularly in FIGURE 9, each mandrel M comprises an assembly which includes a shouldered post member 59 having a threaded end 59a which is secured in position on a plate member 58 by a nut 60. Roller bearings 61 and 62 mount a grooved drive spindle 63 on each of the posts 59 and bolted on each spindle 63 as at 64 is a core member 65 on which a container support member 66 is fixed, each member 66 having an extending flange portion 66a which extends radially beyond the fiber, container-shaped upper member 67 carried on each support member 66 to furnish support for the radially extending rim r of a container C.

It will be seen that each fiber mandrel part 67 includes an upper recess 68 and vacuum ports 69 which communicate with a central bore 70, there being a threaded bore portion 70a accommodating a threaded stud 71 which is also received in a threaded bore 65a provided in the member 65, and which is secured in position by a nut 72. When the containers C are first received on the mandrel M they are held in position by vacuum forces exerting a suction via the line 69, the bore 70, the bore 73 in the stud 71, the opening 74 in the member 65, the bore 75 in the spindle 59, and a pipe 76 received in the threaded portion 59a of post 59 which communicates with a vacuum source.

Each mandrel assembly M has its associated transfer unit T for moving a container C from the platform 48 to the mandrel assembly M and vertically positioning it thereon in a positive manner. As shown particularly in FIGURES 1, 2, 8, and 9, each transfer unit T includes a base 77 bolted to the inner end of one of the plate members 58 as at 78. A vertical column 79 is fixed to each base 77 and includes a top plate 80. Connected between each base 77 and top plate 80 is a support post 81, a screw 82 securing each post 81 at its upper end. Mounted on each post 81 is a vertically movable slide 83 including a projecting shaft 84 with a follower roller 85 mounted thereon as shown. The roller 85 travels on a stationary cam track member 86 mounted on the frame F which moves the sleeve 83 upwardly and downwardly on the post 81 and it will be noted from an inspection of FIGURE 7 that the vertical column 79 is recessed as at 87 to provide a vertical guide track for a roller 88 carried on each vertical slide member 83 by a shaft 89.

Mounted for a limited pivotal movement on each vertical slide member 83 is a sleeve member 90 which engages a thrust bearing 91 carried by the vertical slide member 83. An arm 92 carried by each sleeve 90 mounts a wire sweep generally designated 93 which includes upper and lower wires 94 and 95 having outer curvilinear portions 94a and 95a. The upper and lower wires 94 and 95 are connetced by vertical wires 96 and at their inner ends are provided with eye portions 94b and 95b so that they can be secured to each arm 92 by screws 92a. It will be seen that the approximately semicircular portions 94a and 95a are open on their clockwise side (see FIGURE 8) and in normal raised position extend horizontally on either side of the guide wires 49 and 50 (see FIGURE 2) so that they can sweep a container C off the platform 48. Not only must the arms 94 and 95 sweep a container C from the platform 48, however; they must also vertically position the container C on the mandrel part 67 in a positive manner. That is to say, the container C must not be received in vertically tilted position on the mandrel part 67 and the laterally extending rim $r$ on the container C must be brought down into full engagement with the flange 66a on the part 66. Accordingly, a tilt preventing wire arm 97 is fixed to each arm 92 to extend at a level just above the wire 94 and a strap 98 carrying a container top engaging button bolt member 98a, secured by a nut 98b, is fixed to each wire 94. The wire 97 may be mounted by the strap 98.

Figure 7:
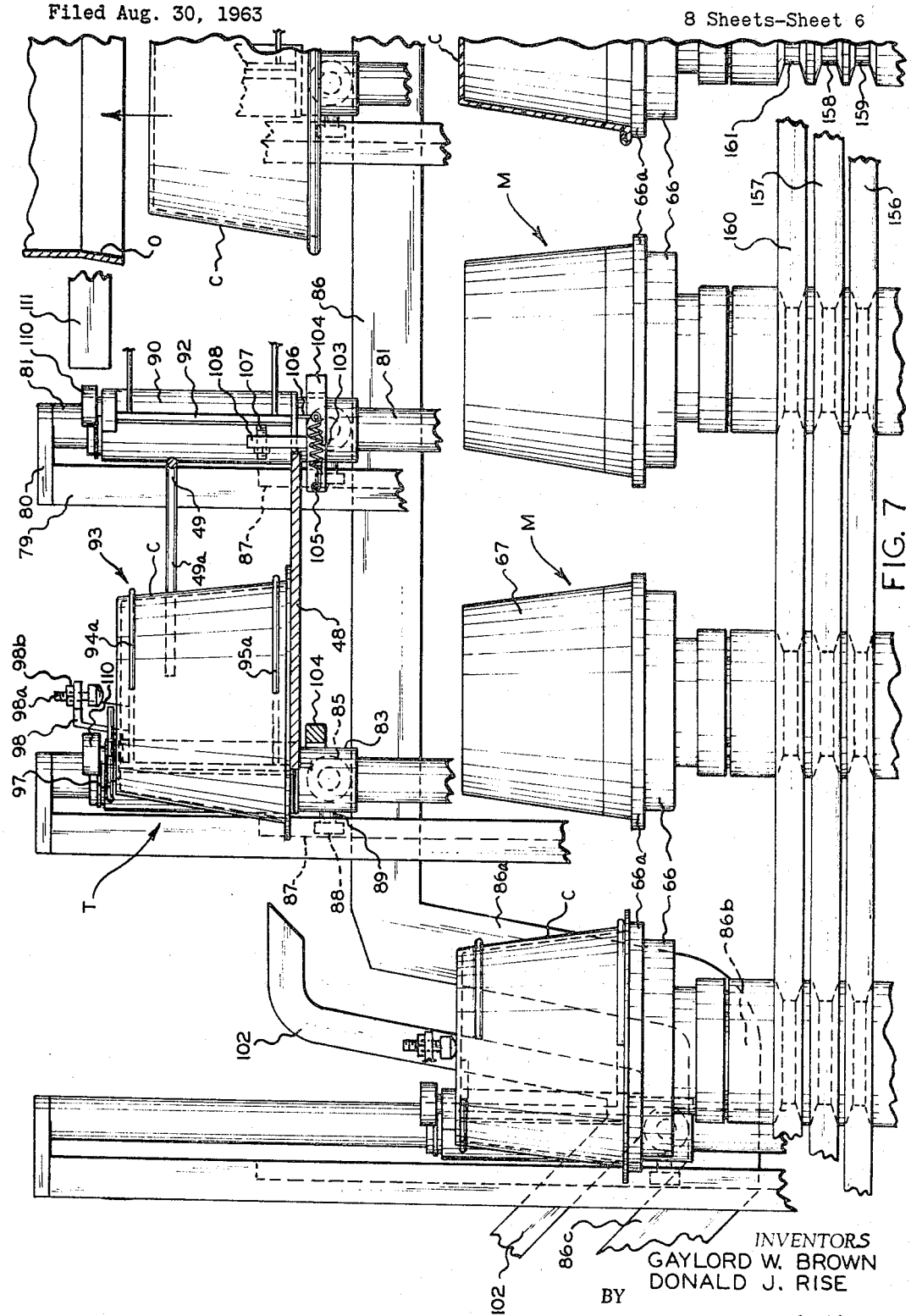
FIGURE 7 is an enlarged, sectional, side elevational view illustrating particularly the transfer mechanism for moving the containers to individual supports of mandrels and positioning them thereon.

As shown in FIGURE 7, the circular cam track 86 includes a generally vertically extending portion 86a, a lower horizontal portion 86b, and a generally vertically extending portion 86c which returns to the previous horizontal level of cam track 86. Thus, each roller 85 traveling along the stationary cam track 86, as the carrier 58 revolves, moves downwardly along the portion 86a so that the container C is forced positively down over the mandrel part 67 and, once this is accomplished, then moves upwardly once again to its previous level. The stationary cam track 86 extends 360° and is mounted in position by vertical bracket members 99 (see FIGURES 2 and 9) which are connected by a horizontal member 99a. The member 99a is, of course, a portion of the frame assembly F and is supported by a top rail 100 mounted by vertical members 101 (see FIGURE 1) which connect to the sides of the generally rectangular frame assembly F. To prevent the rollers 85 from becoming disengaged from the cam track 86, a guide member 102 of corresponding configuration may be mounted by the brackets 99 in position above the sections 86a, 86b and 86c of the cam track 86.

A spring member 103 mounted on an arm 104 connected to the vertical slide 83 normally urges each sweep assembly 93 in a clockwise direction. Each spring 103 is connected between a pin 105 on each arm 104 and a pin 106 on each arm 92. A stop screw 107 (FIGURE 8) mounted by a member 108 on each arm 104 adjustably locates the normal position of the sweep member 93. Each sleeve member 90 includes a radially projecting arm 109 with a follower roller 110 pivotally mounted thereon which is adapted to engage a stationary cam 111 supported by the frame F as the transfer mechanism T travels clockwisely with the carrier assembly R, and to pivot the transfer mechanism T counterclockwisely (as the top sweep member 93 is shown pivoted in FIGURE 8). The stationary cam 111 is supported by brackets 112 from the brackets 98, as shown in FIGURE 2, and extends from a point counterclockwisely removed from the platform 48 to substantially the area where the platform leads radially to the carrier assembly R. The sweep assembly arms 93 are held in counterclockwisely retracted position by the cam 111 to permit a formed container C to be ejected out the tube O.

Figure 8:
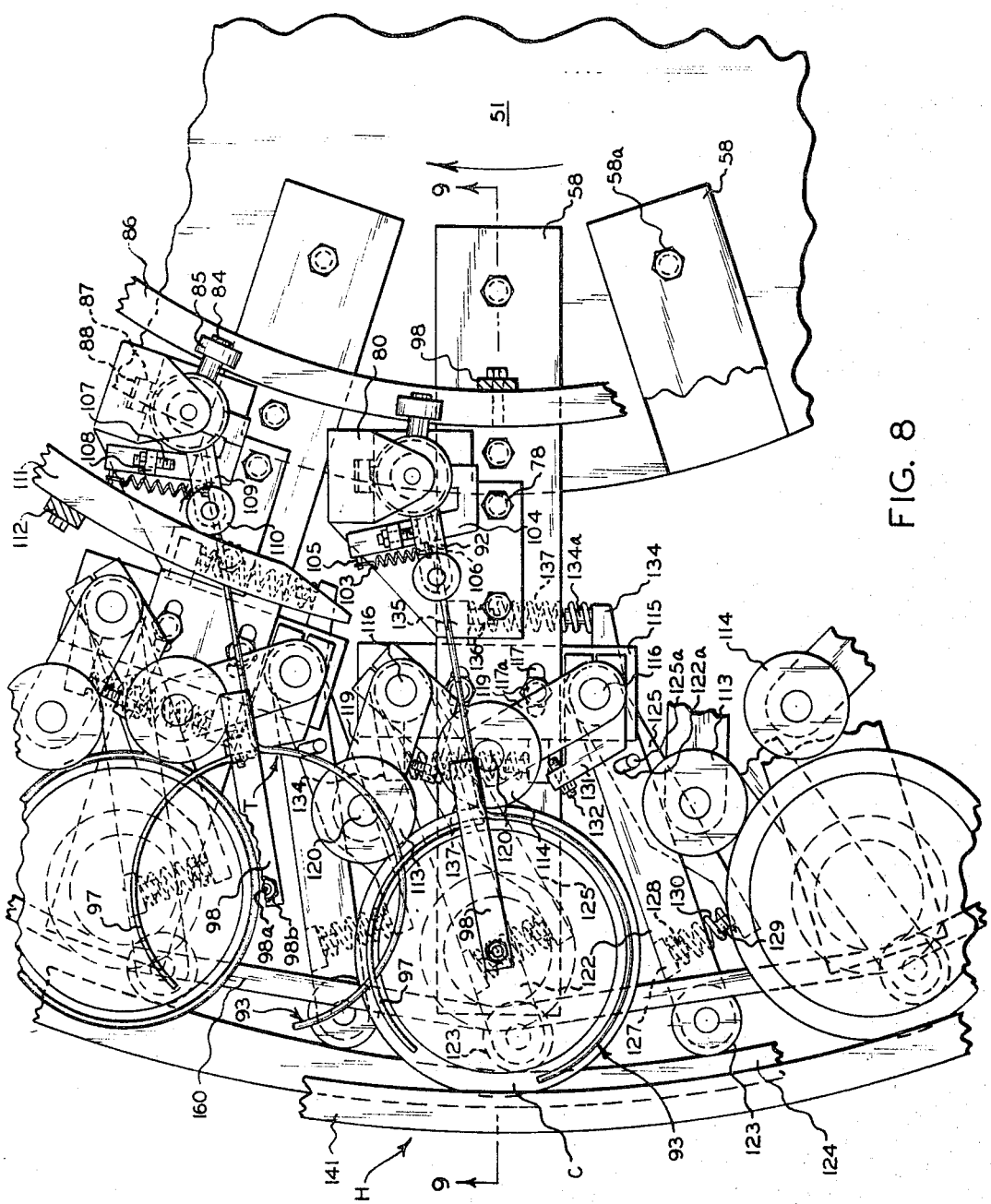
FIGURE 8 is a fragmentary, top plan view further illustrating the transfer mechanism and illustrating also the sequentially operated rim curling rolls.
Figure 9:
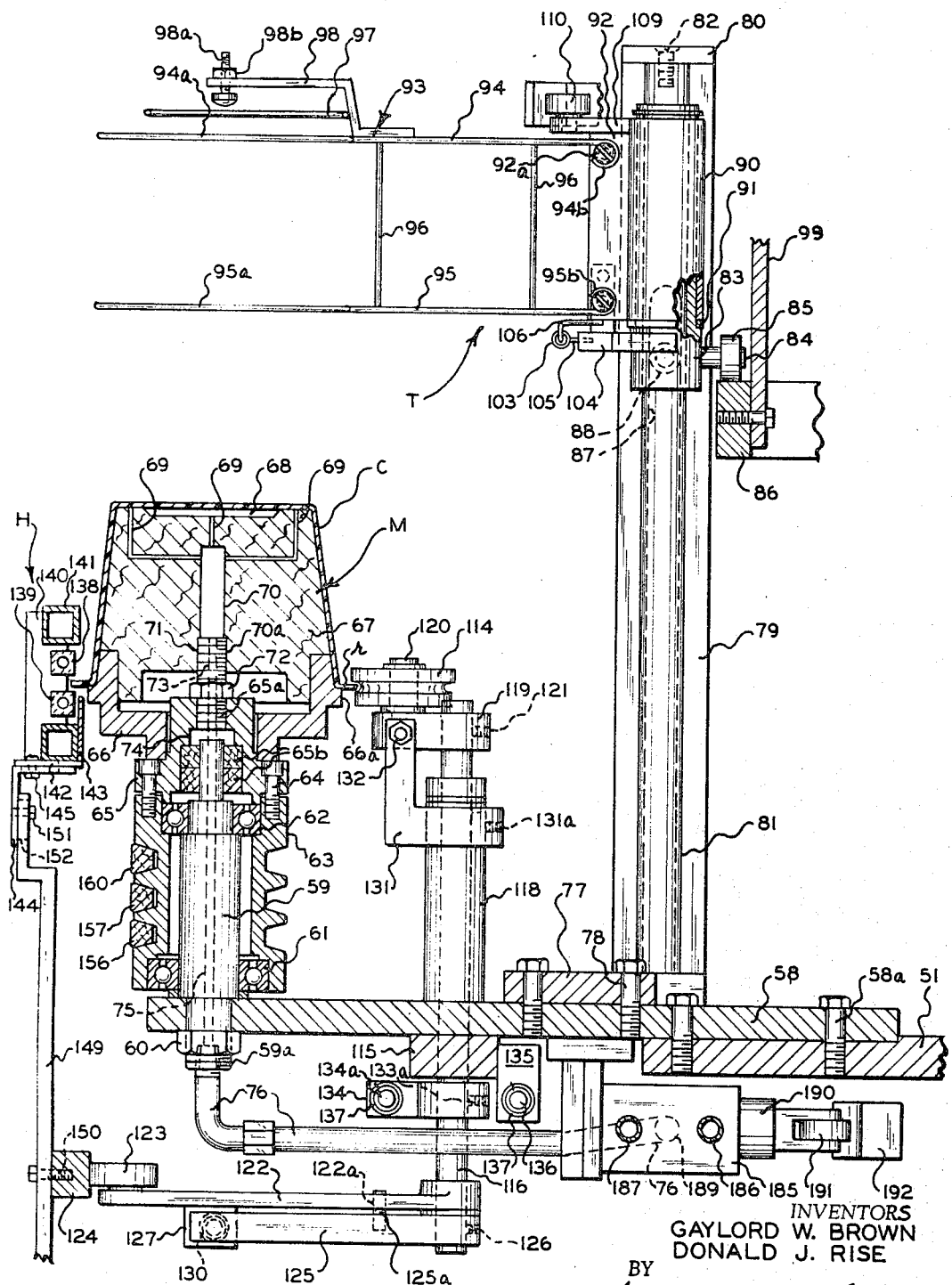
FIGURE 9 is a sectional, side elevational view of one of the container receiving mandrels and its associated transfer mechanism.

A grooved initial forming roller 113 and a grooved finishing roller 114 are mounted on each plate member 58 adjacent each mandrel assembly M, as shown in FIGURES 1, 8 and 9 particularly. The groove $g1$ of each roller 113 is slightly greater in diameter than the groove $g2$ in each roller 114. Adjustably mounted on each radial support plate 58 is a crossbar 115 which supports a pair of shafts 116 which mount the rollers 113 and 114. The crossbars 115 include slots 117 (see FIGURE 8) and bolts 117a may be used to fix the crossbars 115 in adjusted position. The shaft assemblies for mounting and actuating the rollers 113 and 114 are identical. Each shaft 116 is journaled within a bearing sleeve 118 and mounts an arm 119 supporting the vertical pin 120 on which the roller 113 or 114 is mounted, the arm 119 being secured to the upper end of the shaft by set screws or the like, as at 121. At its lower end each shaft 116 journals a radially extending arm 122 which carries a follower roller 123 adapted to engage the stationary cam 124, which is supported by the frame F. A second arm 125 is fixed to each shaft 116, as with a set screw 126, and is carried slightly counterclockwisely of each arm 122. The arms 122 and 125 are connected, each arm 122 having a lost motion slot 122a to accommodate a vertical pin 125a provided on each arm 125. Also, each arm 122 carries a spring mount 127 with a projecting pin 128 and each arm 125 similarly carries a pin 129 so that a spring 130 normally urging the arms 122 and 125 apart may be mounted thereon. When the roller 123 initially engages the cam 124, the arm 122 is pivoted clockwisely on shaft 116 and, when the pin 125a is forced counterwisely also, the shaft 116 is pivoted counterclockwisely, as viewed in FIGURE 8, and the arm 119 which mounts the roller 113 or 114 is pivoted counterclockwisely into engagement with the rim of the container C. An arm 131 mounted on each sleeve 118 carries a stop screw 132 which limits the travel of the arm 119, the arm 131 being secured to the nonrotatable sleeve 118 by set screws 131a or the like.

Near the lower end of each shaft 116 an extending arm member 134 is mounted as with set screws 133a, the arm 134 carrying a spring mounting pin 134a. While the arms 134 for each of the shafts 116 mounted by a bar 115 extend in radially opposite directions, they are identical parts and each cooperates with a block 135 mounted on the bar 115 which also has a spring mounting pin 136. Return springs 137 for the rollers 113 and 114 which normally bias the rollers 113 and 114 to a removed position out of engagement with the rim $r$ of a container C on the associated mandrel assembly M are mounted by the pins 134a and 136.

While the containers C are transferred to the carrier assembly R with their rims $r$ in a heated conditions, they are not heated to the rim curling temperature at the time of their transfer to the mandrel assemblies M. A stationary heater assembly H is provided around more than two thirds of the carrier assembly R which includes a pair of spaced apart resistance heating rod elements 138 and 139 between which the rim $r$ is received as shown in FIGURE 9. The heating units 138 and 139, which comprise resistance wires imbedded in electrically insulating material, are of a conventional nature and may be the Chromalox rods mentioned. They can be supported by vertical angle plate members 140, which also mount upper and lower coolant tubes 141 and 142 through which a suitable coolant such as water is continuously circulated. Mounted on the lower tube 142 is a stainless steel shield 143, as shown. The resistance heating elements 138 and 139, the tubes 141 and 142, and the shield 143 extend the full length of the heating unit H and may be supported by the circumferentially spaced brackets 140 which are connected to the support ring 144 carried by frame F by screw members 145. The ring 144 can be supported from the frame F in any suitable manner, as with vertical bars 146 (FIGURE 1). The coolant lines for feeding water to and removing it from the upper coolant tube 141 are shown at 147 and 148, respectively. It is to be understood that identical inlet and outlet tubes connected to a suitable pump system for circulating coolant are similarly connected to the lower coolant tube 142. Ring member 144, as shown in FIGURE 9, also supports the cam 124 for actuating the rollers 113 and 144, the cam 124 being supported by brackets 149 which are connected to the cam 124 by bolts 150 and to the angle ring 144 by bolts 151, the openings 152 through the upper ends of each member 149 being elongated so that vertical adjustment is possible.

The drive mechanism

As shown particularly in FIGURE 1, a suitable electric motor 153 is mounted on the member 101 of the frame F in a manner such that its armature shaft 154 extends upwardly, and provided on the armature shaft 154 is a pulley 155 mounting a pair of drive belts 156 and 157 (see FIGURE 7). The drive belts 156 and 157 may be engaged within the lower grooves 158 and 159 provided in each mandrel spindle member 63. Plainly, those mandrel spindles 63 in engagement with the belts 156 and 157 will be continuously rotated thereby. However, it will be noted from an inspection of FIGURE 1 that certain of the mandrel assemblies M are not in engagement with the belts 156 and 157 as they pass from the container conveying platform 48. So that all of the mandrels M will be continuously rotated, a third belt 160 is provided which engages within the upper grooves 161 of the mandrel spindles 63 and which, also, is trained around an idler pulley 162 mounted on a shaft 163 supported from a bearing block 164 on the frame F.

A second electric motor 165 is provided for continuously revolving the spindle 52 (see FIGURE 2) of the carrier assembly R. The armature shaft 167 of the motor 165 mounts a sprocket 168 around which a chain 169 is trained which also is trained around a sprocket 170. Sprocket 170 is mounted on the output shaft 171 of a gear reduction box 172 which has an upwardly extending output shaft 173 mounting a sprocket 174. A chain 175 is trained around the sprocket 174 and around the sprocket 176 mounted on the spindle 52. A second sprocket 177 mounted on the output shaft 173 of the gear reduction box 172 is provided for driving the shaft 15, there being a drive chain 178 trained around the sprocket 177 and around a sprocket 179 mounted on the shaft 15.

The air-vacuum system

As noted previously, the line 76 which connects to the mandrel cup 67 may be connected to a vacuum source and is, in fact, during most of the rotary travel of the mandrel assemblies M clockwisely from the platform 48. However, when the mandrel assemblies M move around to a position underneath the vertical discharge tube O (see FIGURES 1 and 7), air under pressure is forced up through the tube 76 and the mandrel ports 69 to blow the container C up through the discharge tube O. It will be seen that the spindle 52 (see FIGURE 2) is centrally bored as at 180 and 181. A vacuum tube 182 connected with a suitable suction pump of conventional design is connected to the spindle 52 by means of a rotary coupling joint 183. Similarly, an air tube 184 leading from a compressor or suitable source of air under pressure is coupled to the spindle 52 by means of a rotary joint 185 and supplies air to the bore 181. In association with each mandrel assembly M an air tube 186 and a vacuum tube 187 leads to a cam operated valve 188 which is provided for each mandrel assembly M. The line 76 communicates with an outlet opening 189 provided in the valve 188, as shown in FIGURE 9. The valve 188 is a conventional slide valve including a slide 190 mounting a follower roller 191 which, when the particular mandrel assembly M is approaching the outlet tube O, is moved radially by a cam 192. The valve 188 may be the conventional Hannifin cam operated valve Model C13–25. Normally, the vacuum lines 187 are permitted by the valves 188 to communicate with the lines 76. However, as indicated, when the cam 192 moves a slide 190 inwardly relative to the valve body, the line 76 of a particular mandrel, which at that time is disposed under the outlet tube O, is caused by the valve 188 to communicate with the particular air line 186 so that the container C is blown from the mandrel cup 67 out the outlet tube O. Seals 65b are preferably situated between the mandrel parts 65 and 59 to assure maintenance of the desired air pressure.

The operation

In operation, two stacks of containers C are fed downwardly through the preheating units $P_1$ and $P_2$, the lowermost container of each stack being intermittently deposited by the units $P_1$ and $P_2$ on the table assembly A, as previously indicated. During their passage downwardly in the rotating stacks, the container rims r are preheated to a certain degree by the electrically powered resistance heating rods 38. The units $P_1$ and $P_2$ operate in unison to simultaneously deposit a pair of containers C on the table assembly A and, since the table assembly A rotates in a clockwise direction, the containers C are moved on the table assembly A to the platform 48, where they are crowded by the containers behind to the curved portion 49a of the guide wire 49. The carrier table 51 of the carrier assembly R is continuously rotated by the motor 165 through the chain 169, gear reduction box 172, and chain 175 which drives spindle 52. As a mandrel assembly M is moved from the outlet tube O to a position under a container C at the guide wire portion 49a, the roller 110 of the transfer assembly T for that mandrel assembly M is released by the stationary cam 111 and the return spring 103 thereof pivots the sweep arm structure 93 clockwisely to restore the sweep unit 93 from a retracted position to normal position. Initially the wire 98 and member 98a are above the container C on platform 48 which is swept from the platform 48 by the wire parts 94a and 95a as the carrier table 51 continues to revolve. However, as the container C leaves the platform 48, the follower roller 85 of the particular transfer unit T commences to travel downwardly on the cam 86 and the container C is engaged and prevented from tilting by wire 98 and engaged and moved downwardly positively onto the mandrel cup part 67 by member 98a. In this manner, control of the movement of each container C is maintained throughout the transfer to the mandrel cut part 67 and each container C is positively positioned thereon with the rim portion r in continuous circumferential engagement with the flange part 66a of the mandrel assembly. Thereafter, the follower roller 85 of the transfer unit T travels upwardly between the cam portions 86c and the guide 102 until the previous level is again reached and remains in raised position until it is again brought around to the platform 48.

Once the sweep assembly lower arm 95a of a particular transfer unit T is raised a short distance to clear the heating assembly H, the container C on the associated mandrel assembly M in its continued clockwise rotation moves opposite the heating assembly H and its rim r is received between the heating rods 138 and 139. The containers C are securely held on the mandrel part 67 by suction forces exerted through the ports 69 and rotate with the mandrel cup part 67. With the containers C rotating continuously, the entire rim r of a container C is heated as it moves clockwisely with the carrier table 51. The coolant tube 140 shields the body portion of the container C from becoming heated to a deformable state and the shield 143 protects the bearings of the spindle assembly from the considerable heat as much as is necessary.

By the time the container C on a particular mandrel assembly M is brought around to the cam 124, its rim r has been heated to a state in which it may be readily curled. When polystyrene containers are being processed, this means that the rims r are heated to about 170° F., which is about 10° below the distortion point of the material. It is anticipated that many types of plastic cups may be processed by the machine, including linear polyethylene and polyvinylchloride containers. As shown in FIGURE 1, the roller actuating cam 124 and the heating assembly H extend contiguously and the rims r continue to be heated during the rim curling operation.

Figure 11:
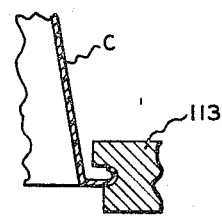
FIGURE 11 is a similar view illustrating the leading roll in a position in which it has moved into engagement with the rim to partially curl it.
Figure 12:
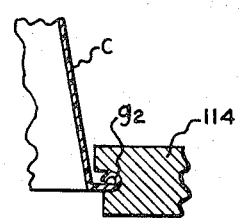
FIGURE 12 is a similar view showing the finishing roll in a position in which it has moved into engagement with the container rim to complete the curling operation.

The rim curling operation is a two stage operation which commences when the leading roller 113 is moved into engagement with the rim r of the cup. As shown particularly in FIGURE 8 and FIGURES 10–12, the arm 122, which controls the leading forming roller 113, will move the roller 113 into engagement with the rim r of the container C before the arm 122 which controls the finishing roller 114 will move the roller 114 into engagement with the container rim r. As previously noted, the radius of the groove g1 of roller 113 is larger than the radius of the groove g2 of roller 114. For instance, in a typical machine the radius of groove g1 may be $\frac{1}{16}$ of an inch when the radius of the groove g2 is 55 thousandths of an inch. Initially, the roller 113 is brought into engagement with the rim r and curls it to the extent shown in FIGURE 11. Shortly thereafter, the arm 122 governing the movement of roller 114 engages the cam 124 also and with its slightly smaller groove and slightly greater radial travel relative to the rim r completes the curl as indicated in FIGURE 12. In each instance, when the arm 122 engages the cam 124 the spring 130 resists compression and tends to move the arm 125 counterclockwisely to turn the shaft 116 and accordingly move the roller 113 or 114 outwardly. The spring 130 is, in each instance, of such strength as to move the rollers 113 and 114 outwardly and furnishes a resilient link in the system so that in essence the deformation is spring forced. With this construction, if there is some undue resistance to curl, the spring 130 can be compressed before parts of the machine are damaged. Once the arm members 122 leave the cam 124, the return springs 137 restore the rollers 113 and 114 to original position and, of course, the springs 130 move the arms 122 once again to original position. The curled rims r are then cooled for a short period before the mandrel assembly M reaches a position under the outlet tube O and compressed air is supplied through the ports 69 to blow the container C upwardly into the discharge tube O in the manner previously described.

Prior to the time the mandrel assembly M is brought around to the outlet tube O, the rollers 110 on the transfer assembly T engage the cam 111 and are pivoted in a counterclockwise direction, as shown in FIGURES 1 and 8, so that they cannot interfere with the discharge of the containers to the collector tube O. They are held in this position by the cam 111 until they travel almost opposite the platform 48, whence they are released by the cam 111, as noted, to transfer the containers C to the mandrels M.

In FIGURE 13 a slightly modified embodiment of the invention is shown. In this version of the invention the heating rods 38 are omitted and the preheating is done at the platform 48, the platform 48 having an outer end section formed with multiple openings 193 to provide a grille-like surface. Under the openings 193 a box-like manifold 194 is provided with is connected via a pipe 195 with a source of hot air supplied by a blower fan or the like from a suitable furnace device.

In addition, the heating unit H shown in the preceding figures may be replaced by a hot air heating system generally designated H' which is illustrated in FIGURES 14 and 15. In this embodiment of the invention a stationary manifold ring 196 is provided which is supplied with hot air from a suitable blower fan and furnace system. Surrounding each manifold assembly M is a duct 197 which has an inner edge in engagement with the edge of the circular manifold 196 and which revolves in continuous engagement therewith. The manifold 196, which extends circumferentially the same distance as the heating system H in FIGURE 1, may be provided with upper and lower seals 198 and 198a which seal the juncture of each of the generally circular ducts 197 with the manifold 196. Provided at the lower inside corner of each duct 197 to direct air downwardly at the rim r of each container C is a slotted opening 199 which extends continuously around the tubular duct 197. As shown in FIGURE 14, the rollers 113 and 114 and their associated mechanism may be mounted just below the ducts 197 so as to be in a position to move freely into and out from the rim r of a container received on a manifold assembly M. Air supplied at a high temperature to the manifold 196 is blown by a suitable blower fan in the hot air system out the slotted opening 199 which extends continuously around each duct 197 and is directed at the rim r. If desired, when the particular manifold assembly M travels clockwisely beyond the cam 124, a coolant manifold of exactly the same construction as the hot air manifold 196 may be provided, and may be supplied from a source of cold air to blow cold air out the opening 199 at the curled rim r until the mandrel assembly M moves under the outlet tube O.

It is to be understood that we have perfected a rim curling machine which produces high quality curled rims on containers on a mass production basis. It is to be understood that the drawings and descriptive matter are in all cases to be interpreted as merely illustrative of the principles of the invention, rather than as limiting the same in any way, since it is contemplated that various changes may be made in the various elements to achieve like results without departing from the spirit of the invention or the scope of the appended claims.

We claim:

1. In apparatus for forming a rolled rim on an organic plastic container or the like; carrier means movable through a path of travel; a plurality of support means for supporting containers having rim portions; heating means for each support means in position to heat the container thereon; forming tool means for performing a work operation on said containers; means for relatively rotating said support means and forming tool means, said heating means comprising a manifold on said carrier having opening means positioned adjacent each support to direct heated air at said rim portions; and means for furnishing heated air and forcing it out said opening means.

2. In apparatus for forming a curled rim on an organic plastic container or the like; axially extending support means for supporting a container having a rim position; radially movable first forming tool means having a groove for receiving said rim portion mounted generally radially adjacent said support means and partially forming it; radially movable second forming tool means having a differing groove mounted generally radially adjacent said support means for receiving a portion of the rim portion formed by said first forming tool means and further forming it; and means for relatively rotating said support means and forming tool means; at least one of the forming tool means grooves being in a plane substantially to the axis of said support means.

3. The combination defined in claim 2 including means for sequentially moving said first and second forming tool means into deforming engagement with said rim.

4. The combination defined in claim 3 in which said second forming tool means moves a greater distance to deform said rim than said first means.

5. In apparatus for forming a rolled rim on an organic plastic container or the like; axially extending support means for supporting a container having a radially extending rim portion; forming roll means having a groove for receiving said rim portion mounted for rotation about an axis radially adjacent to and generally axially parallel to said support means; and means for moving said support means and forming roll means relatively radially toward and away from one another to move said rim portion into and out of engagement with said groove.

6. In apparatus for forming rolled rims on organic plastic containers or the like; carrier means; a plurality of container-shaped supports thereon for supporting containers having rim portions; loading surface means adjacent said carrier means; a transfer element on said carrier means adjacent each support for transferring a container to each support from said loading surface means; forming tool means for receiving the rim portion of a container and forming it; and means for relatively rotating said supports and forming tool means.

7. In apparatus for forming rolled rims on organic plastic containers or the like; carrier means; a plurality of container-shaped supports thereon for supporting containers having rim portions; loading surface means adjacent said carrier means; container rim preheating means associated therewith; heating means associated with said carrier means for bringing said container rims to a deformable state; forming tool means for receiving the rim portion of a container mounted on each support and forming it; and means for relatively rotating said supports and forming tool means.

8. The combination defined in claim 7 in which said preheating means comprises a perforate surface over which said containers pass and hot air supply means for forcing air up through said surface.

9. The combination defined in claim 7 in which said preheating means comprises a container stack supporting apparatus incorporating circumferentially spaced heating elements; and means for relatively revolving said stack and rods.

10. In apparatus for performing an operation on organic plastic containers or the like; carrier means; a plurality of container-shaped, container supporting, male mandrel supports permanently mounted thereon for rotation about their axes; means for continuously moving said carrier means through a path of travel; means for supplying containers; means for guiding said containers to a telescoped position on said mandrel supports; port means for said supports; means selectively operable to apply a suction through said port means to hold containers on said supports or to force air therethrough to blow said containers from said supports; means for performing a work operation on said containers; and means for relatively rotating said support means and work performing means.

11. The combination defined in claim 6 in which each transfer element comprises a curved, rim engaging sweep member normally in overhead relation with a container support and mounted for vertical sliding travel; and stationary cam means normally supporting each sweep member above the level of said loading surface means, moving said sweep member downwardly to positively position a container on each container support once the container has been swept from the loading surface means by the sweep member.

12. The combination defined in claim 11 in which each sweep member is pivotally mounted to swing out away from overhead relation with a container support to permit removal of the container from the support; stationary cam means is provided for swinging each sweep member away; and spring means normally urges each sweep member into said overhead relation.

13. A machine for performing an operation on organic plastic containers having: a carrier; a plurality of spaced apart, container-shaped male mandrels permanently supported on the carrier; tool means adjacent the path of the mandrels; means for moving the carrier past a container supplying member; transfer element means on the carrier adjacent each mandrel operable for transferring a container in inverse position into telescoped position on each mandrel from the supplying member; and means for relatively rotating the mandrels and tool means.

14. A machine as set forth in claim 13 wherein means is provided for holding the containers in position on the mandrels.

15. A machine as set forth in claim 13 wherein means is provided for alternately applying suction to hold containers on the mandrels and applying fluid under pressure to eject the containers from the mandrels.

16. A machine as set forth in claim 13 wherein said transfer element means comprises a plurality of transfer elements on the carrier adjacent each mandrel; each transfer element comprises a curved container engaging, sweep member mounted normally in overhead relation with a mandrel and mounted for vertical sliding travel; and stationary cam means is provided normally supporting each sweep member above the level of the loading surface and moving the sweep member downwardly to positively position a container on each mandrel once the container has been swept from the loading surface.

17. A machine as set forth in claim 16 wherein means pivotally mounts each sweep member on a support; and stationary cam means engages each sweep member to swing it out away from overhead relation with a mandrel to permit ejection of the container from the mandrel.

18. A machine as set forth in claim 16 wherein a part of the sweep arm normally overlies a mandrel.

References Cited

UNITED STATES PATENTS

| | | | |
|---|---|---|---|
| 2,039,626 | 5/1936 | Raiche. | |
| 2,114,794 | 4/1938 | Brating. | |
| 2,362,058 | 11/1944 | Emerson | 25—26 |
| 2,440,377 | 4/1948 | Myers | 18—20 |
| 2,542,811 | 2/1951 | Griffing | 18—19 X |
| 2,629,159 | 2/1953 | Briggs | 25—24 |
| 2,685,708 | 8/1954 | Pollock | 18—20 X |
| 2,733,493 | 2/1956 | Bryer. | |
| 2,881,475 | 4/1959 | Wikckens | 18—20 |
| 3,207,826 | 9/1965 | Yost | 18—19 X |
| 3,271,503 | 9/1966 | Shelby | 18—19 X |
| 2,259,508 | 10/1941 | Abramson | 18—19 X |
| 2,274,827 | 3/1942 | Emmerich | 18—19 |
| 2,385,147 | 9/1945 | MacDonald | 18—19 |
| 2,532,844 | 12/1950 | Hulbert et al. | 18—19 |
| 2,958,901 | 11/1960 | Molla | 18—19 |
| 3,096,546 | 7/1963 | Edwards | 18—19 X |
| 3,183,291 | 11/1963 | Muller et al. | 18—19 |
| 2,632,227 | 3/1953 | Steele et al. | 18—2 X |

WILLIAM STEPHENSON, *Primary Examiner.*